US010759275B2

(12) United States Patent
Uchida et al.

(10) Patent No.: US 10,759,275 B2
(45) Date of Patent: Sep. 1, 2020

(54) VEHICLE DRIVE APPARATUS

(71) Applicant: Honda Motor Co., Ltd., Tokyo (JP)

(72) Inventors: Kenta Uchida, Wako (JP); Andrii Pydin, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 147 days.

(21) Appl. No.: 16/101,227

(22) Filed: Aug. 10, 2018

(65) Prior Publication Data

US 2019/0078673 A1 Mar. 14, 2019

(30) Foreign Application Priority Data

Sep. 8, 2017 (JP) ................................ 2017-173057

(51) Int. Cl.

*B60K 17/16* (2006.01)
*F16H 7/06* (2006.01)
*B60K 17/08* (2006.01)
*B60K 1/00* (2006.01)
*B60K 7/00* (2006.01)
*F16H 48/11* (2012.01)
*F16H 48/42* (2012.01)
*F16H 7/02* (2006.01)

(52) U.S. Cl.

CPC ............ *B60K 17/165* (2013.01); *B60K 17/08* (2013.01); *F16H 7/02* (2013.01); *F16H 7/06* (2013.01); *B60K 7/0007* (2013.01); *B60K 2001/001* (2013.01); *B60K 2007/0084* (2013.01); *F16H 48/11* (2013.01); *F16H 48/42* (2013.01)

(58) Field of Classification Search

None
See application file for complete search history.

(56) References Cited

U.S. PATENT DOCUMENTS 4,613,011 A * 9/1986 van der Lely ....... B60K 17/303 180/261
7,384,357 B2 * 6/2008 Thomas .............. B60K 17/356 180/247
7,588,113 B2 * 9/2009 Scharfenberg ....... B60K 7/0007 180/253
7,854,674 B2 * 12/2010 Freudenreich ....... B60K 7/0007 475/5

FOREIGN PATENT DOCUMENTS

JP 2012029369 A 2/2012

* cited by examiner

*Primary Examiner* — Ernesto A Suarez
*Assistant Examiner* — James J Taylor, II
(74) *Attorney, Agent, or Firm* — Duft & Bornsen, PC

(57) ABSTRACT

A vehicle drive apparatus, including: an electric motor rotating about an axial line in a vertical direction, a first planetary gear mechanism of a single pinion type and a second planetary gear mechanism of a double pinion type arranged inside the electric motor, a torque transmission mechanism transmitting a torque output from the second planetary gear mechanism to a pair of drive shafts. The torque transmission mechanism includes a first torque transmission unit transmitting a torque output from a sun gear of the second planetary gear mechanism to one of the pair of drive shafts, and a second torque transmission unit transmitting a torque output from a carrier of the second planetary gear mechanism to the other of the pair of drive shafts.

4 Claims, 5 Drawing Sheets

1 100 7 15 12 16 10 11 14 13 21 23 24 2 22 41 51 4 5 UP DOWN 33 34 3 32 67 66 75 64 72 77 76 73 63 60 35 31 74 71 61 70 CL1 6 LEFT RIGHT

UP
DOWN
RIGHT
LEFT
CL1
100
1
2
3
4
5
6
7
10
11
12
13
14
15
16
21
22
23
24
31
32
33
34
35
41
51
60
61
63
64
66
67
70
71
72
73
74
75
76
77

200
204
206
201
209,210
202
1
ΔH
67,77
100
71~73
61,63
6
4,5

VEHICLE DRIVE APPARATUS

CROSS-REFERENCE TO RELATED APPLICATION

This application is based upon and claims the benefit of priority from Japanese Patent Application No. 2017-173057 filed on Sep. 8, 2017, the content of which is incorporated herein by reference.

BACKGROUND OF THE INVENTION

Field of the Invention

This invention relates to a vehicle drive apparatus for traveling a vehicle.

Description of the Related Art

Conventionally, there is a known vehicle driving apparatus of this type, in which an electric motor is installed under a vehicle seat in a state with an axis of rotation of the motor oriented in vehicle height direction and torque of the motor is transmitted to a shaft extending in a front-back direction through a pair of bevel gears. Such an apparatus is described in Japanese Unexamined Patent Publication No. 2012-029369 (JP2012-029369A), for example. In the apparatus described in JP2012-029369A, a bevel gear is provided on an upper end portion of a shaft fitted on a center part of a rotor of the motor.

In an apparatus described in JP2012-029369A, the bevel gear projects above an upper end of a casing. Therefore, when the apparatus according to JP2012-029369A is to be used to output torque of the motor to left and right drive shafts, a differential mechanism such as an automotive differential unit needs to be installed above the motor in engagement with the bevel gear. As a result, the vehicle drive apparatus becomes vertically large and difficult to install in a vehicle's limited available space in the vertical direction.

SUMMARY OF THE INVENTION

An aspect of the present invention is a vehicle drive apparatus, including: an electric motor including a rotor rotating about an axial line in a vertical direction and a stator arranged around the rotor; a first planetary gear mechanism of a single pinion type arranged about the axial line radially inward of the rotor so that a torque output from the electric motor is input to the first planetary gear mechanism; a second planetary gear mechanism of a double pinion type arranged about the axial line radially inward of the rotor and above or below the first planetary gear mechanism so that a torque output from the first planetary gear mechanism is input to the second planetary gear mechanism; and a torque transmission mechanism configured to transmit a torque output from the second planetary gear mechanism to a pair of drive shafts for driving left and right drive wheels. The second planetary gear includes a ring gear to which the torque output from the first planetary gear mechanism is input, a sun gear arranged inside the ring gear, a first planetary gear engaged with the sun gear, a second planetary gear engaged with the ring gear, and a carrier configured to rotatably support the first planetary gear and the second planetary gear in a state where the first planetary gear and the second planetary gear engage with each other. The torque transmission mechanism includes a first torque transmission unit and a second torque transmission unit, arranged above or below the electric motor in a state offset from each other in the vertical direction. The first torque transmission unit is configured to transmit a torque output from the sun gear to one of the pair of drive shafts, and the second torque transmission unit is configured to transmit a torque output from the carrier to the other of the pair of drive shafts.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
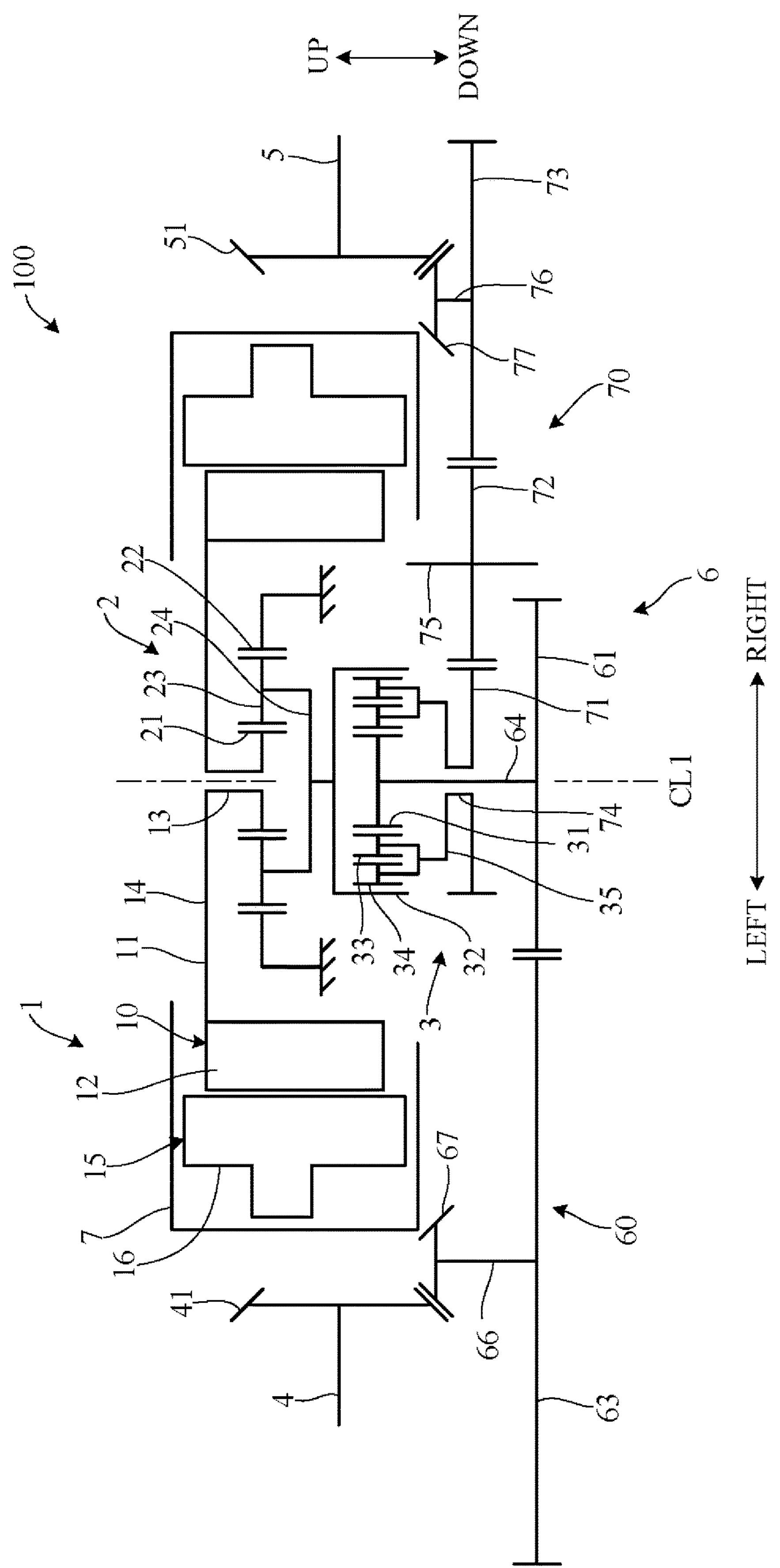
FIG. 1 is a skeleton diagram showing main components of a vehicle drive apparatus according to an embodiment of the present invention.

Hereinafter, an embodiment of the present invention is explained with reference to FIGS. 1 to 5. FIG. 1 is a skeleton diagram showing main components of a vehicle drive apparatus (vehicle drive unit) 100 according to the embodiment of the present invention. The vehicle drive apparatus 100 includes an electric motor 1 as an example of a dynamo-electric machine and is configured to output torque from the motor 1 to driving wheels of a vehicle. Therefore, the vehicle drive apparatus 100 is mounted on an electric vehicle, hybrid vehicle or other vehicle having the motor 1 as a drive (propulsion) power source. The motor 1 is also used as a generator. In FIG. 1, under a condition that the vehicle drive apparatus 100 is mounted on the vehicle, vehicle vertical (height) direction, i.e., up-down direction and lateral (width) direction, i.e., left-right direction are indicated by arrows.

As shown in FIG. 1, the vehicle drive apparatus 100 includes an electric motor 1 which rotates around vertical axis CL1, an axis CL1-centered first planetary gear mechanism 2 installed radially inward of the of the motor 1, an axis CL1-centered second planetary gear mechanism 3 installed radially inward of the motor 1 and below the first planetary gear mechanism 2, a pair of left and right drive shafts 4 and 5 extending leftward and rightward radially outward of the motor 1, and a torque transmission mechanism 6 for transmitting torque output from the second planetary gear mechanism 3 to the left and right drive shafts 4 and 5.

Figure 2A:
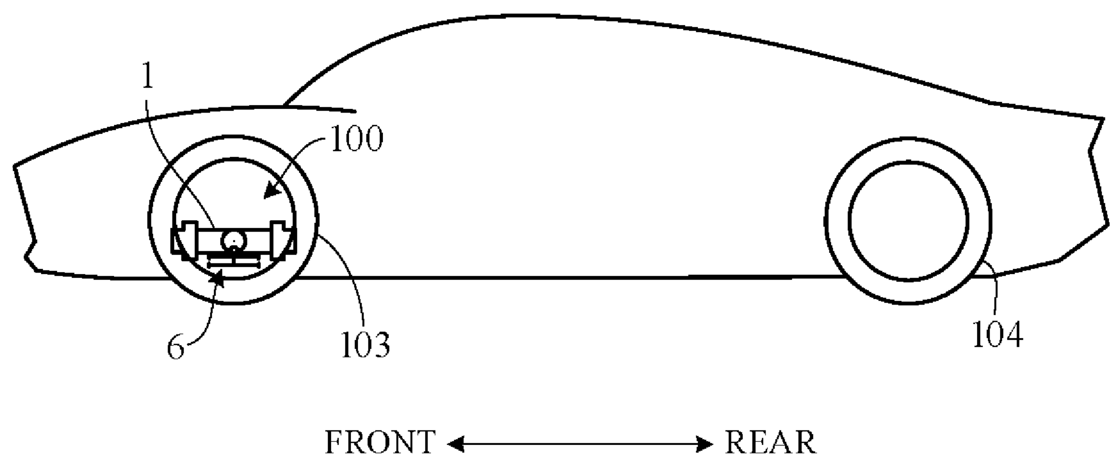
FIG. 2A is a side view showing an example of installing the vehicle drive apparatus of FIG. 1 in a vehicle.
Figure 2B:
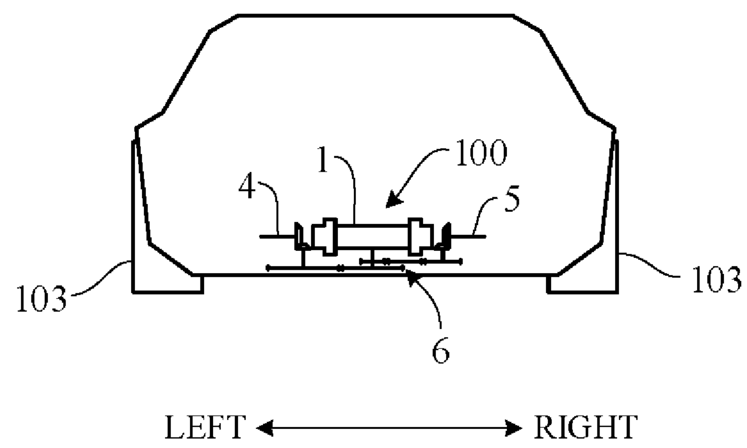
FIG. 2B is a rear view showing an example of installing the vehicle drive apparatus of FIG. 1 in the vehicle.

One drive wheel 103 is connected a left end of the left side drive shaft 4 and another drive wheels 103 is connected to a right end of the right side drive shaft 5 (see FIGS. 2A and 2B). Torque of the motor 1 is transmitted through the first planetary gear mechanism 2, second planetary gear mechanism 3 and torque transmission mechanism 6 to the left and right drive shafts 4 and 5, thereby driving the left and right drive wheels 103.

Structural features of the vehicle drive apparatus 100 are explained in detail in the following. The motor 1 includes a rotor 10 which rotates around axis CL1 and a stator 15 installed around the rotor 10. The motor 1, the first planetary gear mechanism 2 and the second planetary gear mechanism 3 are housed in a case 7 fastened to a vehicle body frame.

The rotor 10 includes a rotor hub 11 and a rotor core 12. The rotor hub 11 includes a substantially cylinder-shaped shaft portion 13 centered on the axis CL1, and a plate portion 14 which extends radially outward from the shaft portion 13 to connect the shaft portion 13 and the rotor core 12. The shaft portion 13 is rotatably supported via a bearing on an outer surface of a non-illustrated shaft extending inside the shaft portion 13 along the axis CL1. The rotor core 12 is a substantially cylinder-shaped rotor iron core centered on the axis CL1, and rotates integrally with the rotor hub 11. The motor 1 is an interior permanent magnet synchronous motor, for example, and multiple circumferentially spaced permanent magnets are embedded in the rotor core 12. Alternatively, it is possible instead to use as the motor 1 one having no magnets, such as a synchronous reluctance motor or switched reluctance motor.

The stator 15 has a substantially cylinder-shaped stator core 16 which is centered on the axis CL1 and disposed across a gap of predetermined radial length from an outer peripheral surface of the rotor core 12. The stator core 16 is a fixed iron core fixed to an inner wall of the case 7. An inner peripheral surface of the stator core 16 is formed with multiple circumferentially spaced radially outward directed slots, and a non-illustrated winding (coil) is formed in the slots as a concentrated winding or distributed winding. Upper and lower ends of the winding protrude upward and downward of upper and lower ends of the stator core 16. The rotor 10 rotates when a revolving magnetic field is generated by passing three-phase alternating current through the winding.

The first planetary gear mechanism 2 is a single pinion planetary gear mechanism including a sun gear 21 and a ring gear 22, both centered on axis CL1, planetary gears 23 engaged with the sun gear 21 and ring gear 22, and a carrier 24 for rotatably supporting the planetary gears 23. The ring gear 22 is fixed to the inner wall of the case 7, while the sun gear 21 and carrier 24 are provided to be individually rotatable around the axis CL1. The sun gear 21 is coupled to a shaft 13 of the rotor hub 11 through splines, for example, to rotate integrally with the rotor hub 11. Rotation of the sun gear 21 is transmitted through the planetary gears 23 to rotate the carrier 24.

The second planetary gear mechanism 3 is a double pinion planetary gear mechanism including an axis CL1-centered sun gear 31 and ring gear 32, radially inward first planetary gears 33 engaged with the sun gear 31, radially outward second planetary gears 34 engaged with the ring gear 32, and a carrier 35 for rotatably supporting the first planetary gears 33 and second planetary gears 34 in mutually engaged state.

The sun gear 31, ring gear 32 and carrier 35 are provided to be individually rotatable around the axis CL1. The ring gear 32 is coupled to the carrier 24 of the first planetary gear mechanism 2 through splines, for example, to rotate integrally with the carrier 24. Rotation of the ring gear 32 is transmitted through the planetary gears 33 and 34 to rotate the sun gear 31 and the carrier 35, respectively. The sun gear 31 and carrier 35 rotate in the same direction at this time.

The torque transmission mechanism 6 includes a first torque transmission unit 60 for transmitting torque output from the sun gear 31 to the left side drive shaft 4 and a second torque transmission unit 70 for transmitting torque output from the carrier 35 to the right side drive shaft 5.

The first torque transmission unit 60 includes a gear train, i.e., two spur gears 61 and 63, installed at equal height in a space below the motor 1. The gear 61 is installed to be rotatable around a rotating shaft 64 extending along axis CL1. The rotating shaft 64 is coupled to the sun gear 31 of the second planetary gear mechanism 3 through splines, for example, whereby the gear 61 is rotated integrally with the sun gear 31 by the rotating shaft 64. The gear 63 is installed to be rotatable around a rotating shaft 66 extending parallel to axis CL1. The gears 61 and 63 are engaged, and torque output from the sun gear 31 is transmitted through the gear 61 to the gear 63.

The rotating shaft 66 of the gear 63 is arranged leftward of the motor 1 and extends upward. A bevel gear 67 is provided at an upper end portion of the rotating shaft 66. The bevel gear 67 engages a bevel gear 41 provided at a right end portion of the drive shaft 4. As a result, torque of the gear 63 is transmitted through the pair of bevel gears 67 and 41 to the drive shaft 4, thereby rotating the drive shaft 4.

The second torque transmission unit 70 includes a gear train, i.e., three spur gears 71 to 73, installed at equal height in a space below the motor 1 and above the gears 61 and 63. The gear 71 is supported by a cylinder-shaped rotating shaft 74 centered on axis CL1, and the rotating shaft 64 passes through interior of the rotating shaft 74. The rotating shaft 74 is coupled to the carrier 35 of the second planetary gear mechanism 3 through splines, for example, whereby the gear 71 is rotated integrally with the carrier 35 by the rotating shaft 74. The gears 72 and 73 are installed to be rotatable around rotating shafts 75 and 76 parallel to axis CL1. The gears 71 and 73 engage the gear 72, and torque output from the carrier 35 is transmitted through the gears 71 and 72 to the gear 73.

The rotating shaft 76 of the gear 73 is arranged rightward of the motor 1 and extends upward. A bevel gear 77 is provided at an upper end portion of the rotating shaft 76. The bevel gear 77 engages a bevel gear 51 provided at a left end portion of the drive shaft 5. As a result, torque of the gear 73 is transmitted through the pair of bevel gears 77 and 51 to the drive shaft 5, thereby rotating the drive shaft 5. The drive shaft 5 rotates in the same direction as the drive shaft 4 at this time.

The left and right drive shafts 4 and 5 are installed at a height in a range between a lower surface and an upper surface of the motor 1 (e.g., its stator 15). More specifically, the drive shafts 4 and 5 are installed at approximately the same height as the heightwise middle of the rotor 10. Upper ends of the bevel gears 41 and 51 are positioned below the upper surface of the motor 1, and upper surface of the case 7 is located at an uppermost part of the vehicle drive apparatus 100. The spur gears 61 and 63 of the first torque transmission unit 60 are located at a lowermost part of the vehicle drive apparatus 100.

In the so-configured vehicle drive apparatus 100, torque of the motor 1 is transmitted through the sun gear 21 and carrier 24 of the first planetary gear mechanism 2 to the ring gear 32 of the second planetary gear mechanism 3. Torque transmitted to the ring gear 32 is on the one hand transmitted through the second planetary gears 34, first planetary gears 33 and sun gear 31 to the rotating shaft 64 of the first torque transmission unit 60 and on the other through the planetary gears 33 and 34 and carrier 35 to the rotating shaft 74 of the second torque transmission unit 70. Torque transmitted to the rotating shaft 64 is transmitted through the spur gears 61 and 63 and bevel gears 67 and 41 to the left side drive shaft 4, and torque transmitted to the rotating shaft 74 is transmitted through the spur gears 71 to 73 and bevel gears 77 and 51 to the right side drive shaft 5. Therefore, torque of the motor 1 can be transmitted to the left and right drive wheels for vehicle propulsion.

As set out in the foregoing, the vehicle drive apparatus 100 of the present embodiment is configured to orient axis CL1 of the motor 1 in vehicle height direction, and the first planetary gear mechanism 2 and second planetary gear mechanism 3 are installed inside the rotor 10 of the motor 1. This makes provision of a bevel gear type differential mechanism unnecessary and enables simultaneous output of torque of the motor 1 to the left and right drive shafts 4 and 5 while minimizing overall height of the vehicle drive apparatus 100. Therefore, a large diameter motor required for developing high output can be easily installed in a height-restricted space of a vehicle.

FIGS. 2A and 2B are a side view and rear view (diagram viewing from rear) diagrams showing examples of installation of the vehicle drive apparatus 100 in vehicles, and show examples of installing the vehicle drive apparatus 100 between left and right front wheels 103 for use as a front wheel drive unit. The vehicle drive apparatus 100 may be also installed between left and right rear wheels 104 for use as a rear wheel drive unit.

As shown in FIGS. 2A and 2B, the vehicle drive apparatus 100 is arranged near a bottom surface of the body and at the middle in left-right direction of the vehicle. Therefore, height of the vehicle hood can be lowered to realize enhanced superiority of design and the like. Further, although illustrating is omitted, without arising to raise the floor surface inside the vehicle, i.e., narrowing an inside space of the vehicle, it is possible to easily install the vehicle drive apparatus 100 even below the seat or between left and right rear wheels 104. As a result, a degree of freedom for arrangement of the vehicle drive apparatus 100 is fine.

Figure 3:
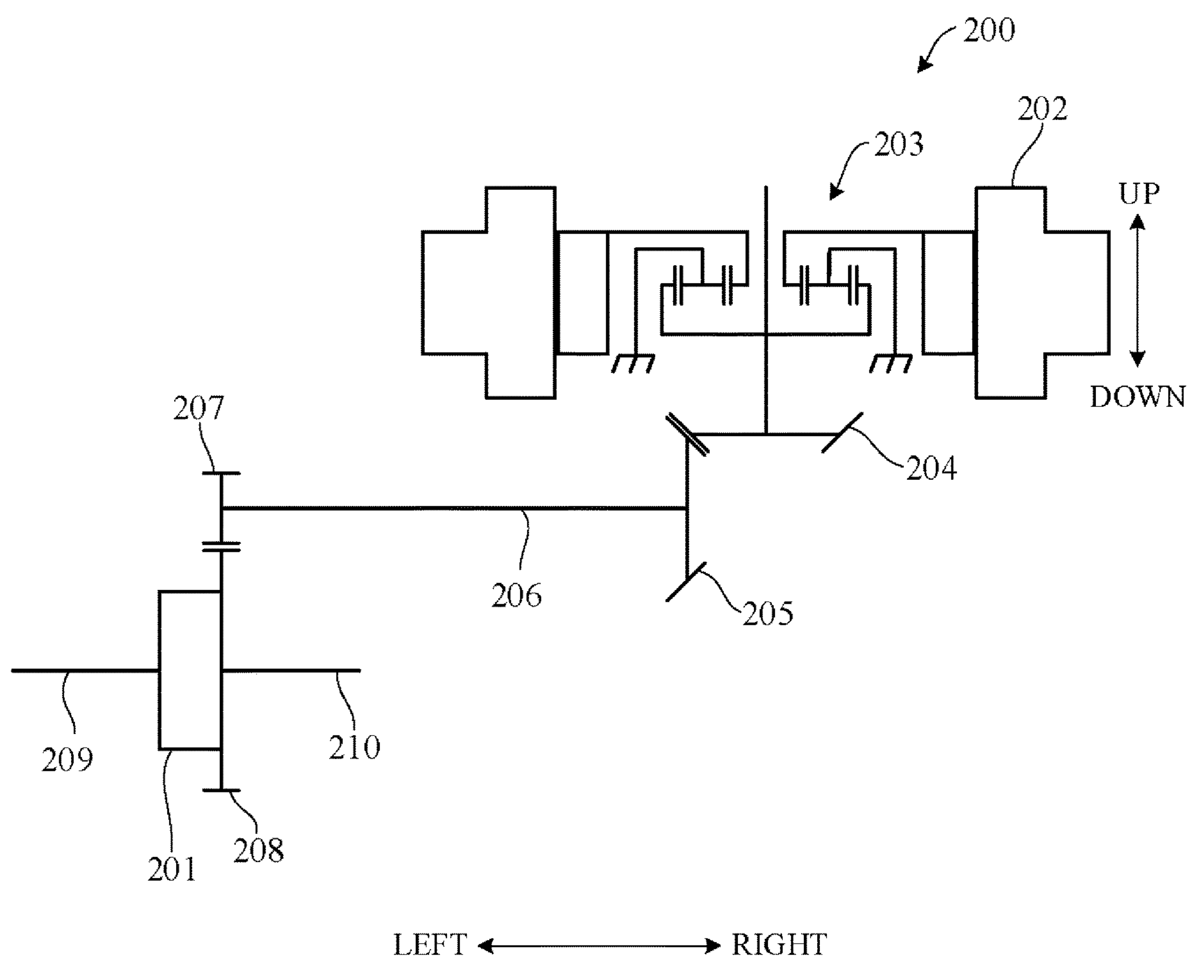
FIG. 3 is a skeleton diagram showing a comparative example of FIG. 1.

FIG. 3 is a skeleton diagram of a vehicle drive apparatus 200 shown as an example for comparison with the embodiment shown in FIG. 1. Instead of the double pinion second planetary gear mechanism 3, the vehicle drive apparatus 200 includes a bevel gear type differential mechanism 201 incorporating multiple bevel gears (pair of left and right bevel gears and pair of bevel gears engaged with these bevel gears). In the configuration of FIG. 3, torque of an electric motor 202 is transmitted through a planetary gear mechanism 203 and bevel gears 204, 205 to a rotating shaft 206 extending laterally below the motor 202, and torque of the rotating shaft 206 is further output through bevel gears 207, 208 and the differential mechanism 201 to left and right drive shafts 209 and 210.

Figure 4:
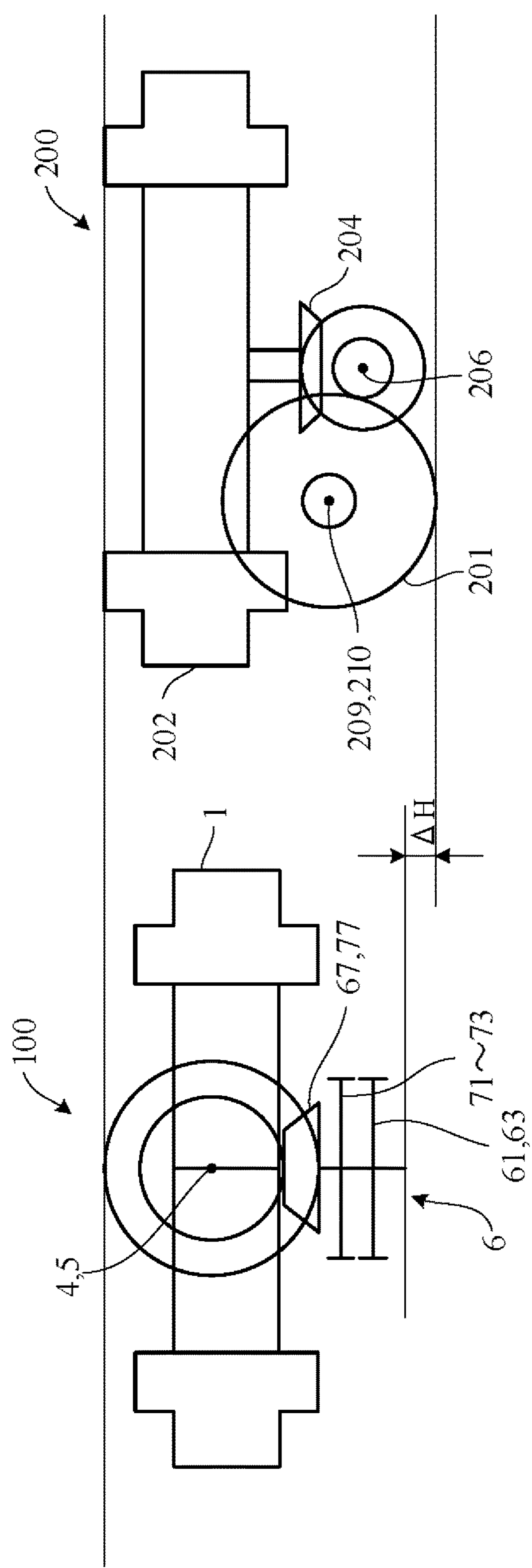
FIG. 4 is a diagram showing a comparison of the vehicle drive unit of FIG. 1 and the vehicle drive unit of FIG. 3 when mounted in the vehicle.

FIG. 4 is a side view of the vehicle drive apparatuses 100 and 200 of FIGS. 1 and 3 showing a comparison of their heights when mounted in a vehicle. In the vehicle drive apparatus 100 according to the present embodiment, the spur gears 61, 63 and 71 to 73 incorporated in the torque transmission mechanism 6 are located under the motor 1, and in addition, the bevel gears 67 and 77 are situated above the spur gears 61, 63 and 71 to 73. Torque of the motor 1 is transmitted through the spur gears 61, 63 and 71 to 73 and the bevel gears 67 and 77 to the drive shafts 4 and 5. Owing to this configuration, protrusion of the torque transmission mechanism 6 upward or downward of the motor 1 can be minimized, whereby height of the vehicle drive apparatus 100 can be minimized.

In contrast, when the configuration of the vehicle drive apparatus 200 is adopted, the bevel gear 204 protrudes downward of the motor 202, and since the bevel gear type differential mechanism 201 therefore has to be installed below the motor 202, size of the vehicle drive apparatus 200 increases in height direction. As a result, overall height of the vehicle drive apparatus 200 comes to exceed that of the vehicle drive apparatus 100 by ΔH.

According to the embodiment, the following operations and effects can be achieved.

(1) The vehicle drive apparatus 100 according to the present embodiment includes: the motor 1 having the rotor 10 which rotates centered on vertical axis CL1 and the stator 15 arranged around the rotor 10; the single pinion first planetary gear mechanism 2 arranged radially inward of the rotor 10 centered on axis CL1 and adapted to receive input of torque from the motor 1; the double pinion second planetary gear mechanism 3 arranged radially inward of the rotor 10 centered on axis CL1 and below the first planetary gear mechanism 2 and adapted to receive input of torque output from the first planetary gear mechanism 2; and the torque transmission mechanism 6 adapted to transmit torque output from the second planetary gear mechanism 3 to the pair of left and right vehicle propulsion drive shafts 4 and 5 (FIG. 1). The second planetary gear mechanism 3 includes the ring gear 32 adapted to receive input of torque output from the first planetary gear mechanism 2, the sun gear 31 arranged inside the ring gear 32, the first planetary gears 33 engaged with the sun gear 31, the second planetary gears 34 engaged with the ring gear 32, and the carrier 35 for rotatably supporting the first planetary gears 33 and second planetary gears 34 in mutually engaged state (FIG. 1). The torque transmission mechanism 6 includes the gear train of the first torque transmission unit 60 (gears 61 and 63) and the gear train of the second torque transmission unit 70 (gears 71 to 73) arranged below the motor 1 at positions vertically offset from each other, and torque output from the sun gear 31 is transmitted through the gears 61 and 63 to the left side drive shaft 4, while torque output from the carrier 35 is transmitted through the gears 71 to 73 to the right side drive shaft 5 (FIG. 1).

Thus the motor 1 is arranged with its axis of rotation CL1 oriented vertically and its torque is output to the left and right drives shafts 4 and 5 through the double pinion second planetary gear mechanism 3 arranged inside the rotor 10 and the gears 61, 63 and 71 to 73 arranged under the motor 1, and since this configuration obviates need for installation of a bevel gear type differential mechanism under the motor 1, overall height of the vehicle drive apparatus 100 can be minimized. This enables the vehicle drive apparatus 100 equipped with the large diameter motor 1 capable of high power output to be easily arranged between the left and right front wheels 103 or between the left and right rear wheels 104, for example, thereby enabling output of torque of the motor 1 directly to the drive shafts 4 and 5 without need for an interposed propeller shaft.

(2) The gears 61, 63 and 71 to 73 arranged under the motor 1 are configured as spur gears which rotate around vertical rotating shafts 64, 66 and 74 to 76 (FIG. 1). Therefore, protrusion of the torque transmission mechanism 6 downward of the motor 1 can be minimized.

(3) The left and right drive shafts 4 and 5 are located within a predetermined height range lower than an upper end portion and higher than a lower end portion of the motor 1, more specifically, the motor 1 is located at substantially same height as the drive shafts 4 and 5 (FIG. 1). Therefore, the vehicle drive apparatus 100 can be compactly arranged between the left and right drive shafts 4 and 5.

(4) The torque transmission mechanism 6 additionally includes the left and right rotating shafts 66 and 76 arranged radially outward of the motor 1, extended upward toward the left and right drive shafts 4 and 5, respectively, and adapted to receive input of torque output from the second planetary gear mechanism 3 through the gears 61, 63 and 71 to 73, respectively (FIG. 1). The left and right rotating shafts 66 and 76 have the bevel gears 67 and 77 at their respective upper end portions (FIG. 1). This enables torque from the spur gears 61, 63 and 71 to 73 located below the motor 1 to be easily transmitted to the drive shafts 4 and 5 located to the left and right of the motor 1.

Figure 5:
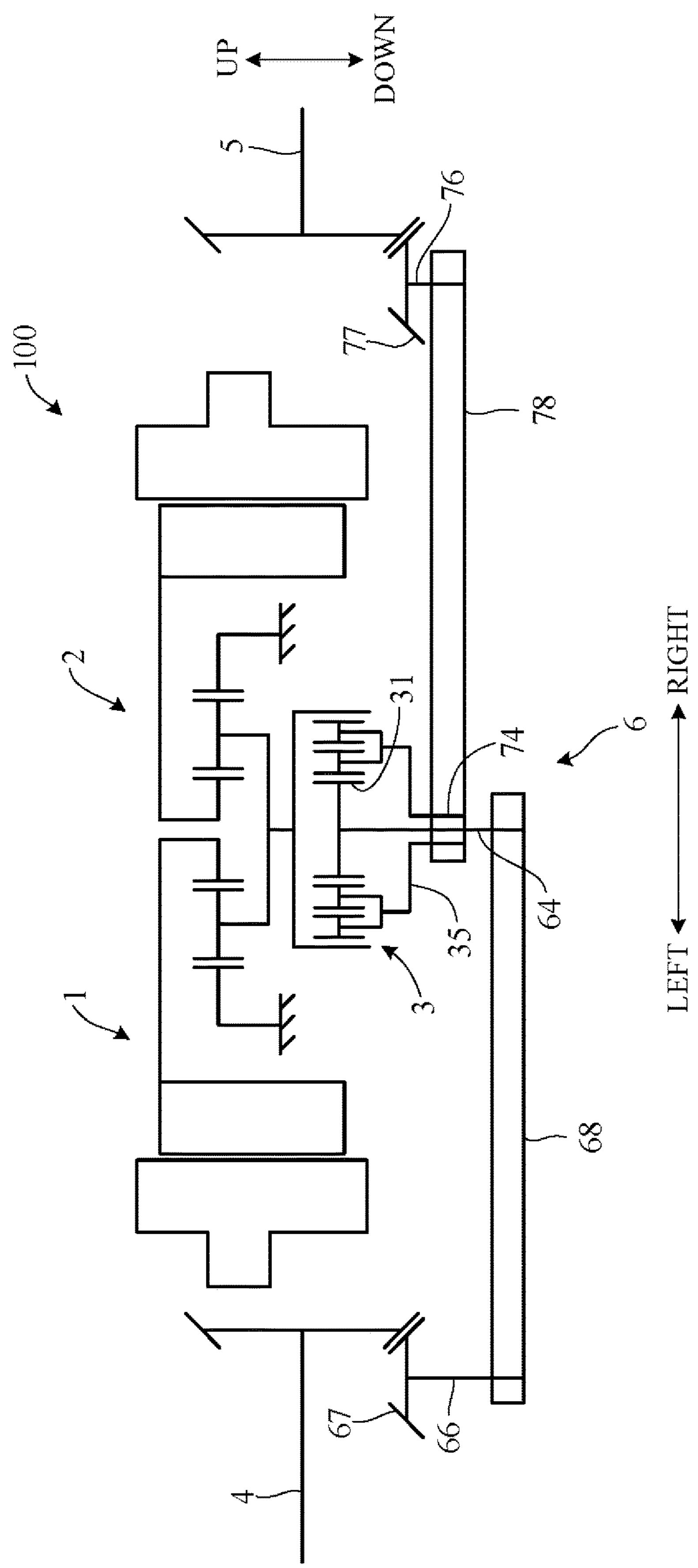
FIG. 5 is a diagram showing a modification of FIG. 1.

Various modifications of the present embodiment are possible. An example is explained in the following. FIG. 5 is a diagram showing a modification of the embodiment of FIG. 1. In FIG. 5, the torque transmission mechanism 6 is configured to include horizontally extending chains 68 and 78 or belts instead of the spur gears 61, 63 and 71 to 73. The chain 68 is wound around the rotating shaft 64 (more exactly, sprocket provided at the rotating shaft 64) and rotating shaft 66 (more exactly, sprocket provided at the rotating shaft 66), and the chain 78 is wound around the rotating shaft 74 (more exactly, sprocket provided at the rotating shaft 74) and rotating shaft 76 (more exactly, sprocket provided at the rotating shaft 76). As a result, torque from the second planetary gear mechanism 3 is input to the rotating shaft 66 through the chain 68 and to the rotating shaft 76 through the chain 78.

Optionally, a configuration can be adopted that transmits torque output from the sun gear 31 of the second planetary gear mechanism 3 to the drive shaft 4 (one of a pair of drive shafts) through a first torque transmission unit other than the spur gears 61 and 63 or the chain 68. A configuration can also be adopted that transmits torque output from the carrier 35 of the second planetary gear mechanism 3 to the drive shaft 5 (the other of the pair of drive shafts) through a second torque transmission unit other than the spur gears 71 to 73 or the chain 78.

In the aforesaid embodiment, a first torque transmission unit such as the spur gears 61 and 63 or chain 68 is installed lower (more toward the second planetary gear mechanism 3 side) than a second torque transmission unit such as the spur gears 71 to 73 or chain 68, but higher installation is also possible. In the aforesaid embodiment, the first torque transmission unit and the second torque transmission unit are installed below the motor 1, but installation thereof above the motor 1 is also possible.

The above embodiment can be combined as desired with one or more of the above modifications. The modifications can also be combined with one another.

According to the present invention, it is possible to easily arrange the vehicle drive unit in a predetermined height-restricted space of a vehicle without increasing size thereof in height direction.

Above, while the present invention has been described with reference to the preferred embodiments thereof, it will be understood, by those skilled in the art, that various changes and modifications may be made thereto without departing from the scope of the appended claims.

What is claimed is:

1. A vehicle drive apparatus, comprising:

an electric motor including a rotor rotating about an axial line in a vertical direction and a stator arranged around the rotor;

a first planetary gear mechanism of a single pinion type arranged about the axial line radially inward of the rotor so that a torque output from the electric motor is input to the first planetary gear mechanism;

a second planetary gear mechanism of a double pinion type arranged about the axial line radially inward of the rotor and above or below the first planetary gear mechanism so that a torque output from the first planetary gear mechanism is input to the second planetary gear mechanism; and a torque transmission mechanism configured to transmit a torque output from the second planetary gear mechanism to a pair of drive shafts for driving left and right drive wheels, wherein the second planetary gear mechanism includes a ring gear to which the torque output from the first planetary gear mechanism is input, a sun gear arranged inside the ring gear, a first planetary gear engaged with the sun gear, a second planetary gear engaged with the ring gear, and a carrier configured to rotatably support the first planetary gear and the second planetary gear in a state where the first planetary gear and the second planetary gear engage with each other, the torque transmission mechanism includes a first torque transmission unit and a second torque transmission unit, arranged above or below the electric motor in a state offset from each other in the vertical direction, the first torque transmission unit is configured to transmit a torque output from the sun gear to one of the pair of drive shafts, the second torque transmission unit is configured to transmit a torque output from the carrier to the other of the pair of drive shafts, and the pair of drive shafts are located within a height range lower than an upper end of the electric motor and higher than a lower end of the electric motor.

2. The vehicle drive apparatus according to claim 1, wherein the first torque transmission unit and the second torque transmission unit include spur gears rotating around rotating shafts extending in the vertical direction.

3. The vehicle drive apparatus according to claim 1, wherein the first torque transmission unit and the second torque transmission unit include chains extending in a horizontal direction.

4. The vehicle drive apparatus according to claim 1, wherein the torque transmission mechanism further includes a pair of rotating shafts arranged leftward and rightward outside the electric motor in a radial direction and extending in the vertical direction toward the pair of drive shafts, the pair of rotating shafts respectively include bevel gears at ends thereof, and the first torque transmission unit and the second torque transmission unit are configured to transmit the torque output from the second planetary gear mechanism to the pair of rotating shafts, respectively.

* * * * *